United States Patent [19]
Schwaller

[11] 3,862,751

[45] Jan. 28, 1975

[54] DUAL STAGE COMPRESSOR SPRING

[76] Inventor: Bernard L. Schwaller, 8918 Spring Branch Dr., Houston, Tex. 77055

[22] Filed: Sept. 28, 1972

[21] Appl. No.: 293,086

[52] U.S. Cl................ 267/91, 267/179, 137/540, 267/168
[51] Int. Cl.............................................. F16f 1/26
[58] Field of Search ............. 267/91, 166, 179, 168

[56] References Cited
UNITED STATES PATENTS

| | | | |
|---|---|---|---|
| 446,203 | 2/1891 | Remy | 267/179 |
| 1,031,763 | 7/1912 | Woodland | 267/179 |
| 1,200,022 | 10/1916 | Price | 267/168 |
| 3,507,486 | 4/1970 | Schwaller | 267/162 |
| 3,559,976 | 2/1971 | Jerz | 267/168 |

FOREIGN PATENTS OR APPLICATIONS

| | | | |
|---|---|---|---|
| 14,685 | 1881 | Germany | 267/166 |

*Primary Examiner*—Robert J. Spar
*Assistant Examiner*—Kenneth Noland

[57] ABSTRACT

A dual stage energy absorbing spring assembly is provided for use in compressors which operate by reciprocating movement of concentric rings to open and seal the valve and cushion the impact of the rings upon opening the valve.

The spring assemblies of this invention can comprise two concentrically disposed, oppositely helical springs which are provided with buttons at top and bottom to provide bearing surfaces. One spring is longer than the other such that as the assembly is compressed first one, then two springs resist compression, thus increasing spring rate when the second spring is engaged. One of the buttons serves to retain the inner spring while the opposite button is appropriately configured to compensate for spring misalignment such as might occur due to manufacturing tolerances or as a result of vibration and guide the free extremity of the inner spring into proper seating engagement with the opposite button.

5 Claims, 6 Drawing Figures

PATENTED JAN 28 1975
3,862,751

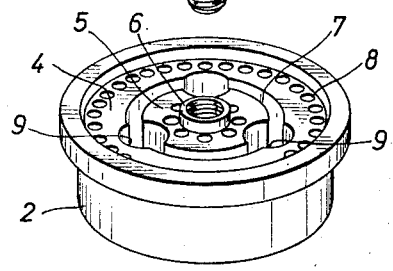

DUAL STAGE COMPRESSOR SPRING

FIELD OF THE INVENTION

This invention relates generally to compressor valves and more specifically to a dual stage energy absorbing spring assembly for use in compressor valves to provide two-stage resistance to the movement of the sealing rings that open and close the valve during operation of the compressor.

BACKGROUND OF THE INVENTION

Valves commonly employed in fluid compressors to provide unidirectional flow into and out of the compressors are known in the art. In these valves, control of fluid flow is controlled by the reciprocal movement of concentric metal rings between a sealing position where the rings seat on machined seating surfaces to an open position wherein the rings are displaced from sealing engagement with these surfaces to permit fluid flow through apertures between the seating surfaces. Springs are commonly employed to hold the concentric rings against the seating surfaces to close the valve. Pressure of the fluid against the rings opens the valve by moving the rings back against the resistance of the springs, while flow in the opposite direction only serves to work with the springs and more tightly seal the valve.

The rings move against the resistance of the springs until the rings contact a second stopping surface or stop. The total distance traversed by the rings in moving from a position against the seating-sealing surface closing the valve to the position against the opposite stopping surface is known as the "lift" of the valve.

Compressors of this type usually operate at 300 to 1,000 revolutions per minute, and the valves may be subjected to extremely high pressures and temperatures. At such compression speeds, the movement of the rings against the seating and stopping surfaces is extremely rapid, and under high pressure, the rings slam into the seating and stopping surfaces at high speed and with great force. Such rapid high velocity movement causes the rings to deteriorate rapidly. The constant movement compresses the spring assemblies many times per minute and causes spring failure. If a spring assembly fails and fragments fall on the seating or stopping surfaces, ring failure is greatly accelerated.

Another cause of valve failure has been spring assembly failure caused by harmonic and natural frequency vibrations or pulsations set up by the rapidly moving springs. It has been found that the force exerted by the rings in compressing the spring assemblies is so great that when the rings slam into the surface, the spring continues to compress and then springs back to contact the ring during some portion of its return to the seating surface or possibly as it is attempting to move back against spring resistance.

These problems may be remedied effectively by providing spring assemblies for compressor valve rings which spring assemblies may be provided with concentric dual stage springs that provide a dual stage energy absorbing facility that effectively varies the spring rate depending upon the position of the valve rings. Dual stage spring assemblies lightly resist movement of the valve rings from the seating surfaces of the valve at a first spring rate during an initial portion of the valve lift and resist movement of the valve rings during the remaining portion of the valve movement and a second spring rate. The second spring rate preferably provides increased resistance to ring movement away from the ring seat and accordingly cushions the spring prior to its striking the stopping surface of the valve. One example of the use of dual stage spring assemblies is taught by U.S. Pat. No. 3,507,486 (Schwaller) which covers a particular dual stage spring assembly for compressor valve control.

In view of the fact that dual stage compressor spring assemblies are quite small and incorporate concentric helical compression springs, it is necessary for the springs to be accurately aligned to prevent the springs from interferring with one another or from becoming misaligned with respect to the buttons that are typically provided to establish seating relation with the ring valves and with stop surfaces formed within the compressor valve housing. Spring interference can cause excessive spring wear and spring misalignment can induce extraneous forces that tend to accelerate deterioration of the compression springs. It is desirable, therefore, that minor misalignment of the compression springs be compensated for such manner as to provide optimum spring contact with the buttons and to eliminate the development of extraneous torsional forces. Moreover, in view of the fact that compressor valve assemblies are typically subjected to severe vibration during use, the springs of the spring assemblies may tend to become loosened by such vibration to the point that the inner spring will become misaligned with respect to the support buttons and the outer spring.

Accordingly, it is a primary feature of the present invention to provide a novel dual stage compressor valve spring assembly that offers resistance at a first spring rate during a first preselected fraction of ring lift and provides a second greater resistance during the remainder of ring lift.

It is another feature of the present invention to provide a novel dual stage compressor valve spring assembly that incorporates concentric compression springs which springs are so related that spring interference is prevented thereby promoting the useful life of the spring mechanism.

It is an even further object of the present invention to provide a novel dual stage compressor valve spring assembly having concentric compression springs maintained in spaced operative relation by buttons that provide bearing surfaces for the spring assemblies and which cooperate to retain the concentric compression springs in proper operating relationship within the spring assembly.

Among the several objects of the present invention is noted the contemplation of the novel dual stage spring assembly for compressor valves that incorporates an inner compression spring of tapered or frusto-conical configuration that cooperates with tapered surface means formed on at least one of the buttons to guide the tapered inner spring into proper seating arrangement with the support button.

It is an even further object of the present invention to provide a novel dual stage spring assembly for compressor valves and the like having a self-alignment feature that is capable of aligning the springs of the spring assembly during operation of the compressor valve in the event the compressor valve springs should become misaligned during operation of the compressor with which the compressor valve is associated.

Other and further objects, advantages and features of the present invention will become apparent to one skilled in the art upon consideration of the written specification, the attached claims and the annexed drawings. The form of the invention, which will now be described in detail, illustrates the general principles of the invention, but it is to be understood that this detailed description is not to be taken as limiting the scope of the present invention.

SUMMARY OF THE INVENTION

Compressor valve assemblies having one or more ring type valve elements may be provided having a plurality of dual stage spring assemblies distributed within the compressor valve assembly and adapted to control movement of the valve rings during operation of the compressor with which the valve is associated. Each of the compressor spring assemblies may incorporate inner and outer concentrically disposed oppositely helical springs that are provided with buttons at the top and bottom of the spring assembly to provide appropriate bearing surfaces.

The buttons may be secured at each extremity of the outer spring by a friction fit while the inner spring may be secured at one extremity thereof to one of the buttons by means of a friction fit. Although the buttons may be of identical configuration or of different configuration within the scope of this invention, at least one of the buttons may be provided with an internal recess defining a bearing surface and a friction surface that may be engaged by one extremity of the inner spring to establish sufficient frictional engagement therewith to retain the inner spring in assembly with the button. The friction surface of the buttons may be of frusto-conical configuration to allow the friction surface of the opposite button to serve as a spring guide surface. The outer spring member may be of generally cylindrical configuration thereby allowing the spring assembly to be retained within generally cylindrical spring recesses defined by cooperating seating and guard portions of the valve housing. The inner spring may be of generally frusto-conical configuration, tapering from a relatively large base portion that is received in frictional engagement with the button to a rather small free extremity that is disposed for engagement with the opposite button only when compression of the spring assembly has exceeded a predetermined degree. Both extremities of the inner spring define substantially planar surfaces for supporting engagement with support surfaces defined by the buttons.

The tapered configuration of the inner spring and the associated tapered or frusto-conical guide surface, formed on the opposite button, cooperates to compensate for minor misalignment of the spring structures and to guide the free smaller extremity of the inner spring into proper seating engagement with the opposite button.

BRIEF DESCRIPTION OF THE DRAWINGS

So that the manner in which the above recited features, advantages and objects of the present invention, as well as others, which will become apparent, are attained and can be understood in detail, more particular description of the invention, briefly summarized above, may be had by reference to the embodiment thereof which is illustrated in the appended drawings, which drawings form a part of this specification.

It is to be noted, however, that the appended drawings illustrate only a typical embodiment of the invention and are therefore not to be considered limiting of its scope, for the invention may admit to other equally effective embodiments. In the Drawings.

DESCRIPTION OF THE PREFERRED EMBODIMENT

Figure 1:
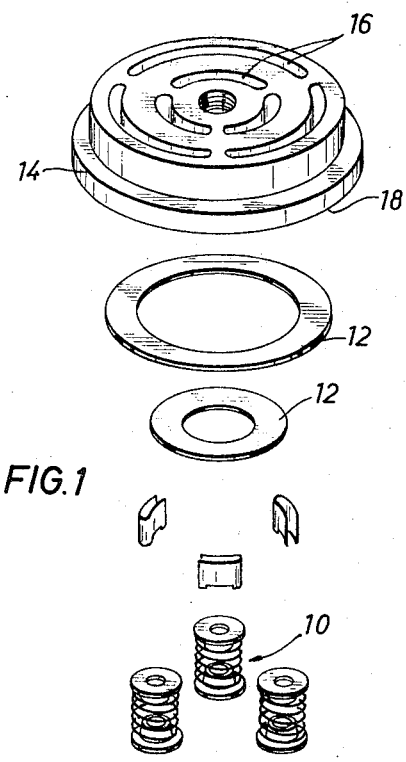
FIG. 1 is a pictorial exploded view of a compressor valve assembly showing the relation of several of the spring assemblies of the present invention to the seat and guard portions of a compressor valve housing.

Referring now to the drawings and first to FIG. 1 and exploded pictorial view of a compressor valve is shown incorporating a spring assembly constructed in accordance with this invention. The compressor valve is comprised of a valve guard portion 2, several spring assemblies 10, concentric sealing rings 12 and a seating member 14. The valve guard portion 2 and the seating member 14, when disposed in assembly, define a valve housing having flow passages formed therethrough the opening and closing of which is controlled by the sealing rings 12 to allow the flow of fluid through the valve assembly in one direction and to prevent flow in the opposite direction.

Valve guard 2 is provided with concentric ring stopping surfaces 4, 5 and 6 and apertures 7 and 8 between adjacent stopping surfaces 4 and 5, and 5 and 6, respectively. Spring retaining recesses 9 are defined within the guard portion of the valve housing and receive spring assemblies 10 to retain the spring assemblies in proper position relative to concentric steel sealing rings 12. Spring assemblies 10 urge rings 12 against the seating surfaces 18 of the valve seat portion 14 of the valve housing, thereby closing the apertures 16 and preventing the flow of fluid through the flow passages.

Figure 2:
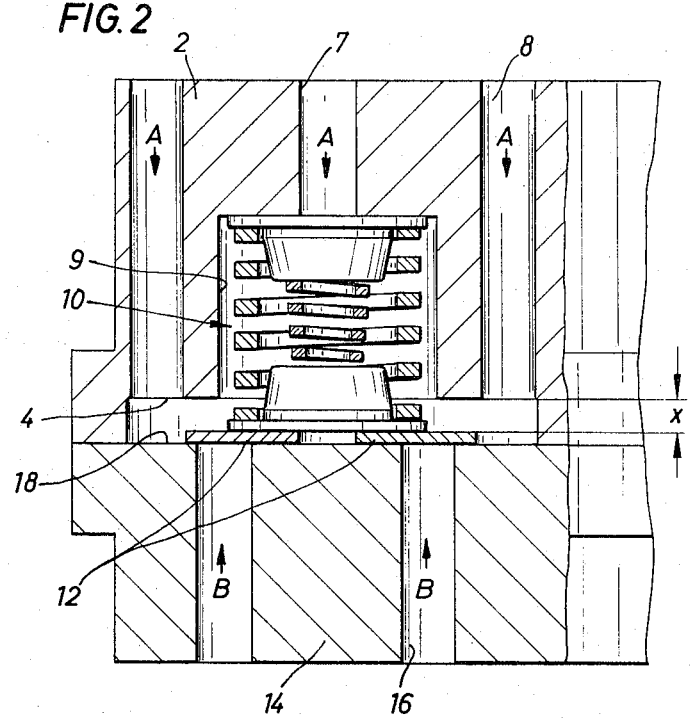
FIG. 2 is a detailed fragmentary cross-sectional view of the compressor valve assembly illustrated in FIG. 1 showing a compressor spring assembly disposed in operative relation with the seat and guard portions of the valve housing and maintaining concentric ring valves in the position blocking the flow of fluid through flow passages formed in the valve housing structure.

Referring now particularly to FIG. 2, the valve guard portion 2 and the seating member 14 are shown to be disposed in assembly to define the compressor valve housing. FIG. 2 is a detailed fragmentary cross sectional view of the compressor valve shown in FIG. 1 showing the relationship of one of the spring assemblies 10 to the guard and seating portions of the valve housing and also showing the relationship of the spring assembly to a pair of concentric sealing rings 12 that are provided to control the flow of fluid through the valve passages. Valve guard 2, with stopping surfaces 4 and 5 and apertures 7 and 8, is shown in relation to valve seat 14 with apertures 16 and seating surfaces 18. Concentric sealing rings 12, which are typically composed of hardened steel, but may be composed of any other acceptable sealing material having wear and heat resistant qualities, are shown in sealing contact with seating surfaces 18 of valve seat 14 to seal apertures 16 to prevent fluid passage from a downward direction as illustrated by the flow arrow A in FIG. 2 and thereby close the valve. The spring recess 9 of the valve guard 2 so positions the spring assemblies 10 that each spring assembly makes contact with two adjacent concentric rings 12, urging the rings into sealing engagement with seating srufaces 18 of the valve seat 14.

When the flow of fluid through the valve reverses during a suction stroke, a low pressure area will be created at "A," causing a higher pressure to be communicated through apertures 16 of the valve seat 14 tending to cause the fluid to flow in the direction established by flow arrows "B" and thereby causing the higher pressure fluid to exert pressure on the sealing rings 12, tending to urge the sealing rings away from sealing engagement with the seating surfaces 18. Spring assembly 10 resists the force exerted by the fluid pressure as the rings are moved or "lifted" to the open position against stopping surfaces 4 of the valve guard 2. The sealing rings 12 are lifted by fluid pressure acting in the direction established by flow arrow B until the sealing rings make contact with stopping surfaces 4 and, during such lifting, compress the spring assembly 10 within spring recess 9. The "lift" of the valve is defined as the distance that the sealing rings 12 travel from sealing engagement with seating surfaces 18 to the full open position in contact with stopping surface 4, shown as distance X in FIG. 2.

Figure 3:
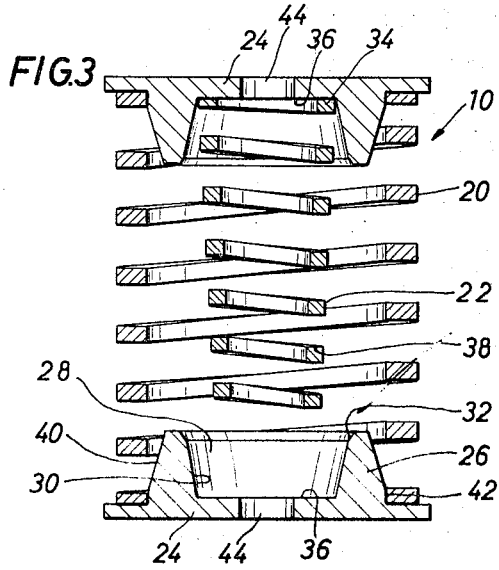
FIG. 3 is a detailed cross-sectional view of the spring assembly of FIGS. 1 and 2 illustrating the spring assembly of the present invention in the expanded position thereof before assembly into a compressor valve.
Figures 4, 5:
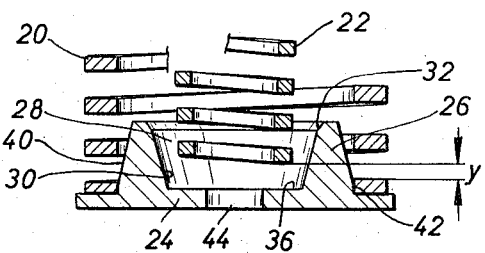
FIG. 4 is a fragmentary sectional view of the compressor valve spring assembly of FIG. 3 in a partially compressed condition thereof as assembled in a compressor valve housing.
FIG. 5 is a detailed sectional view of the spring assembly of FIG. 3 illustrating the spring assembly in a fully compressed position thereof.

Referring now to the specific embodiment of FIG. 3, illustrated in section, the novel spring assembly 10 may include a main or outer spring 20, a cushion or inner spring 22 and buttons 24. The buttons 24 serve to provide a uniform load bearing surface for the spring assembly and to provide a means for retaining the inner cushion spring 22 in substantially concentric relation with the main or outer spring 20. It is desirable that the cushion spring 22 be subjected to compression only after the outer spring 20 has been subjected to a predetermined degree of compression. A cushion spring 22 may be provided, therefore, that is shorter than the outer main spring 20 and may be supported by either of the buttons 24. As illustrated in FIGS. 3 and 4 the inner cushion spring 22 is of generally frusto-conical configuration while the outer main spring 20 is of generally cylindrical configuration. Each of the buttons 24 is provided with an annular projection or hub 26 having an internal recess 28 formed therein and defined by a frusto-conical guide surface 30. The internal edge of the hub 26 may be tapered, as shown at 32, to provide a lead surface that will insure introduction of the cushion spring 22 into the recess 28 upon predetermined compression of the outer spring 20 even under circumstances where the inner spring has become severely misaligned relative to the buttons.

The inner or cushion spring 22 may be provided with a base extremity 34 that is of slightly larger dimension than the complimentary internal dimension of the frusto-conical guide surface 30 adjacent a base surface 36 of the recess 28. This feature allows the base portion 34 of the cushion spring 22 to be retained in frictional engagement with the guide surface 30 as the base portion 34 is brought into engagement with the base surface 36 of the button.

The inner cushion spring 22 tapers to a free extremity 38 that is of smaller dimension than the dimension of the opposed base surface 36 of the opposed button, shown as the lower button in FIG. 3. If the outer spring 20 is cylindrical within tolerance limits and the inner spring 22 is accurately aligned with respect to the upper button 24, the free extremity 38 will move into direct engagement with the base surface 36 of the lower button 24 upon predetermined compression of the outer spring 22.

Figure 6:
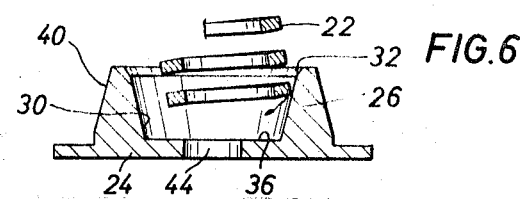
FIG. 6 is a detailed fragmentary sectional view of the compressor valve spring assembly of FIGS 3-5 illustrating engagement of the inner spring member with the spring guide surface during operation of the compressor valve.

Although it is desirable that the free extremity 38 of the inner spring 22 move into direct engagement with the base surface 36 of the lower button 24 upon compression of the outer spring 20 without contacting the side surfaces of the recess, it is likely that in some cases excessive vibration that is induced to the compressor valves during operation of the compressor may cause the inner cushion spring 22 to become slightly misaligned with respect to the recess 28 within which it is received. When such misalignment occurs, the free extremity 38 of the cushion spring may engage the hub portion of the button and such engagement obviously would impair the operational capability of the spring assembly. One suitable means for preventing interferring engagement between the lower button 24 and the free extremity of the inner cushion spring 22 may conveniently take the form of a frusto-conical guide surface, such as illustrated at 30, that may be contacted by the free extremity of the spring 38 upon slight misalignment and may serve to guide the free extremity of the spring 38 into proper supporting engagement with the base surface 36 of the button. The frusto-conical guide surface 30 also has the capability of realigning a misaligned cushion spring during normal operation of the compressor valve assembly thereby eliminating any necessity for disassembling the valve to align the spring assemblies. In the event a cushion spring 22 should become misaligned, upon predetermined compression of the outer spring 22, one edge at the lower extremity 38 of the cushion spring would be moved into engagement with the tapered guide surface 30. When this occurs, a force imparted to the free extremity of the cushion spring, urging the cushion spring laterally, as illustrated by the resultant force arrow, shown in FIG. 6.

In the event the inner cushion spring 22 should suddenly become severly misaligned with respect to the upper and lower buttons 24, such as might occur upon slight loosening of the friction fit between the base portion 34 of the inner spring and the friction surface of the upper button 24, the free extremity of the cushion spring would engage the tapered lead surface 30 and induce a lateral force to the free extremity of the cushion spring, thereby camming the free extremity of the cushion spring laterally and urging it into contact with the tapered guide surface 30. As compression of the main outer spring continues the frusto-conical guide surface 30 would guide the free extremity of the cushion spring 22 laterally causing the cushion spring to move into proper engagement with the base surface 36 of the lower button 24. Lateral camming of the lower extremity 38 of the cushion spring 22 in this manner will impart sufficient lateral force to the cushion spring to substantially realign the cushion spring with respect to the upper one of the buttons 24. When sufficient compression is induced through the inner cushion spring 22, by virtue of the lower one of the buttons 24 moving into firm engagement therewith upon lifting of the lower button 24 by the valve rings 12, frictional engagement between the large extremity 34 of the cushion spring and the frusto-conical surface 30 of the upper button 24 will be reestablished, thereby positively securing the cushion spring in proper alignment with the upper one of the buttons 24.

The outer periphery of the hub 26 of each of the buttons 24 is provided with a tapered clearance surface 40 and a generally cylindrical surface 42. The cylindrical surfaces 42 are of such dimension relative to the dimension of the cylindrical main spring 20 that the extremities of the main spring may be received in frictional engagement with respective ones of the cylindrical surfaces 42, thereby positively securing the buttons 24 in assembly with the outer main spring 20. The tapered clearance surface 40, as shown particularly in FIGS. 3 and 4, provides sufficient clearance with the inner periphery of the spring 20 to prevent the upper portion 26 of the buttons from interferring with the main spring as it is compressed.

When employing the spring assembly of FIGS. 3 and 4 in a compressor valve, lifting of the compressor sealing rings 12 during a suction stroke of the compressor will cause the main spring 20 to be compressed thereby offering a first light resistance to the force exerted by the sealing rings as the sealing rings are moved upwardly by pressure differential created within the valve assembly. Since the cushion spring 22 is of shorter length it is not compressed during the initial portion of the lift of the sealing rings. Near the completion of lift movement by the rings 12, cushion spring 22 will be placed in compression and the resistance to the force exerted by rings 12 will be greatly increased thus slowing the velocity of rings 12 and cushioning their impact against stopping surfaces 4, 5 and 6 of the valve guard 2.

When helical compression springs are compressed there is a tendency for the springs to yield more on one side than another and therefore develop a non-uniform application of force to support surfaces disposed in engagement with the extremities thereof. To insure uniform compression of the main spring 20 and the inner cushion spring 22 of the spring assembly 10, the outer or main spring 20 may conveniently take the form of a helically wound spring adapted for assembly with upper and lower buttons in the manner described above. The inner or cushion spring 22 even though of generally frusto-conical configuration as described above may also take the form of a helically wound spring that is oppositely wound with respect to the main spring 20. For example, as illustrated in FIG. 3, the main spring 20 may, for example, be a right hand wound helical coil spring composed of spring stock having a rectangular cross section thereby providing a spring of relatively light spring rate.

The inner cushion spring 22 may conveniently be a left hand wound helical coil spring of larger cross sectional configuration as compared to stock from which the main spring 20 may be composed and may have a greater spring rate than the main spring. It will be appreciated, however, that the spring rate of a cushion spring 22 may, if desired, be the same or less than the spring rate of the main spring 20.

The cushion spring 22 may be manufactured from spring stock of round or rectangular cross section, if desired, and the coils of the helical spring may vary in size from one extremity to the other thereby developing a helical spring of generally frusto-conical or tapered external configuration. Regardless of the relative spring rate, the combined spring rate of cushion spring 22 and main spring 20, during the last portion of the valve lift, will provide an increased spring rate for the entire spring assembly producing the desired effect. Buttons 24 may be composed of steel or any other such suitable material having one flat load bearing surface and a short hub or sleeve centered on and projecting from the opposite surface thereof. In view of the fact that compressor valves may be subjected to severe vibration, elevated heat conditions and severe spring impact conditions, the material from which the buttons 24 are composed should be capable of withstanding such conditions without being susceptable to excessive deterioration.

As stated above, the main spring 20 and cushion spring 22 are preferably oppositely wound. This opposite winding of the main spring and the cushion spring result in the spring assembly of this invention having more uniform and "flat" resistance to force without a tendency for the assembly to yield more on one side than another. Accordingly, a more uniform resistance is applied to both concentric springs and to the seating rings which contact each spring assembly, thus inducing a uniform resistance to the movement of the seating rings as the rings move against the force of the spring assemblies during opening movement. The balanced resistance to compression forces caused by the oppositely wound helical springs effectively causes the concentric valve rings to be disposed in substantially parallel relation with the seating surfaces at all times thereby promoting operational efficiency of the valve and causing wear or other deterioration to be maintained at a minimum.

Additionally, it should be noted that both outer main spring 20 and cushion spring 22 are preferably composed of spring stock that is rectangular in cross section, which makes control of spring rate of each spring much easier. Thus, an outer spring such as provided in the assembly of FIG. 3 wherein the cross section is rectangular such that the height of a cross section is much less than the width enables providing a spring of low spring rate while not sacrificing the strength of the spring members. Of course the use of a rectangular spring also provides the spring with a flat surface on its upper most and lower most coils to more readily accommodate the buttons disposed at each extremity of the main spring.

It should be noted that both the cylindrical outer spring and the frusto-conical inner spring are provided with wide extremities for proper engagement with the upper and lower buttons. Additionally, the rectangular cross direction of the material, from which the springs are composed, prevents sloughing of the spring in the compressed condition. Thus if one of the coils of outer spring 20 were, during a rapid compression, to contact the next lower coil of the spring, two flat surfaces would engage and there would be no tendency for the upper coil to slip within or without the lower coil. Employment of springs composed of stock having a circular cross section might allow the upper spring members to slough during such compression, thus resulting in possible deformation of the spring.

To facilitate proper engagement between the extremity of each of the inner and outer springs and the base surfaces 36 of the upper and lower buttons, the lowermost coils of the springs are preferably formed or ground in such manner as to define a flat planar surfaces at each extremity of each of the springs. These flat or planar surfaces bear uniformly upon the base surfaces of each of the buttons and therefore evenly distribute forces transmitted between the springs and the buttons. Each of the buttons 24 is provided with a central aperture 44 to permit the passage of fluid through the spring assembly during operation of the compressor valve.

Cushion spring 22 is shorter than the main spring 20 by a preselected amount so that the cushion spring is not engaged and compressed by buttons 24 until the main spring 20 has been compressed by a predetermined amount Y shown in FIG. 3, which is a fraction of valve lift X. Cushion spring 22 will then be compressed during the remaining fraction of the valve lift to provide a final cushioning resistance and an increasing spring rate through rings 12 prior to impacting of rings 12 with the stopping surfaces 4, 5 and 6. It is also appropriate to form or grind the uppermost and lowermost coils of each of the inner and outer springs, thereby insuring that the spring elements bear uniformly on the support surfaces defined on the buttons.

Typically, valve lift on compressor valves range from approximately 0.060 inch to about 0.100 inch. Of course, lift can be greater or less in various valves, depending upon their size, the type of compressor with which they are utilized, the pressures to be encountered and the properties of the fluid being compressed. The first distance that ring 12 will move while compressing the main spring 20 prior to engaging the inner cushion spring 22 is preferably a fraction of the total lift, e.g., from about 50 percent to about 80 percent or 90 percent of the total valve lift.

Thus for example in FIG. 4, distance Y would be preferably 50 percent to about 90 percent of valve lift. Buttons 24 will compress main spring 20 alone through distance Y which is 50 percent to 90 percent of the total valve lift prior to engaging cushion spring 22 for compression during the final 10 percent to 50 percent of the valve lift. Stroke Y of main coil spring 20, is preselected to provide a range of 50 percent to 90 percent of lift X in most valves although it is to be understood that stroke Y can be a greater or a lesser fraction depending upon various factors to be considered for each valve in its use in a particular application. Normally stroke Y may be maintained at 80 percent to 90 percent of the total valve lift so that the cushion spring engages only in the last 10 percent to 20 percent of the valve lift.

The main spring 20 and the cushion spring 22 may be composed of stainless steel, Inconel-X or like metals to provide stress corrosion resistance and resistance to hydrogen embrittlement where this is a problem. Stress corrosion resistance is resistance to chemical and thermal degradation and corrosion which these special metals exhibit even under stress. However, it is not material to the proper function of this invention that such special metals be utilized and any suitable spring material may be employed within the spirit and scope of the present invention. As mentioned above, the springs of the spring assembly may be formed from other suitable materials such as plastic, for example, if such materials are found to have proper vibration, heat and stress resistance qualities.

Dual stage energy absorbing assemblies utilizing the invention herein described can have many applications not limited to compressor valves. For example, coil spring automobile suspensions utilizing the present invention would provide a lighter ride having a softer cushion. Similarly, such dual stage energy absorbing spring assemblies could be utilized as spring returns for hydraulic cylinders and other shock absorbing mounts for rotating or reciprocating machinery. In each case, the cushion spring would be engaged at some desired fraction of the overall compressibility of the first main spring.

Numerous variations and modifications may obviously be made in the structures herein described without departing from the present invention. Accordingly, it should be clearly understood that the form of the invention, described herein and shown in the figures of the accompanying drawings, is illustrative only and is not intended to limit the scope of the present invention.

I claim:

1. A dual stage spring assembly for compressor valves, said spring assembly comprising:
generally cylindrical outer compression spring;
a pair of spring buttons being disposed one at each extremity of said outer spring;
hub means being provided on each of said buttons and being received in frictional engagement within respective extremities of said outer spring;
inner compression spring means disposed within said outer spring means and being supported at a first extremity thereof by one of said buttons with a second extremity thereof being spaced from the other of said buttons during an initial portion of the compression of said spring assembly, allowing said outer spring means to develop a first resistance to compression at a first spring rate during said initial portion of the compression of said spring assembly and said opposite extremity of said inner spring contacting the other of said buttons and cooperating with said outer compression spring to develop a second greater resistance to compression at a second spring rate during the remaining portion of the compression of said spring assembly, said second compression spring being of generally frusto-conical configuration, said first extremity of said inner compression spring being of larger dimension than said second extremity, said first extremity being frictionally retained by one of said hub means; and
a cam surface being defined on said hub means and being disposed for camming engagement by said second extremity of said inner compression spring means for aligning said inner spring during compression of said spring assembly in the event misalignment of said inner spring should occur.

2. A dual stage spring assembly as recited in claim 1, wherein:
said cam surface comprising a frusto-conical guide surface defined on said other of said button means; and
said cam surface being responsive to misalignment of said inner compression spring for imparting transverse movement to said second extremity of said inner spring means during compression movement of said spring assembly and guiding said second extremity into proper engagement with said button.

3. A dual stage spring assembly as recited in claim 1, wherein:
   each of said button means defines base support surface means and at least one of said button means defines said cam surface;
   said first extremity of said second spring means being received in friction tight assembly by said hub means of said one of said button means and engaging said base support surface means; and
   said second extremity of said inner spring means being disposed for engagement with said base support surface means of said other of said button means.

4. A dual stage spring assembly as recited in claim 1:
   said button means defining base surface means and having annular hub means defining inner and outer concentric friction surfaces;
   said outer spring means being disposed in frictional engagement with said outer friction surfaces of both of said buttons; and
   said first extremity of said inner spring means being disposed in frictional engagement with said inner friction surface.

5. A dual stage spring assembly as recited in claim 4:
   said extremities of said inner spring means defining substantially parallel planar surface means for supporting engagement with said base support surface means of said button means.

* * * * *